United States Patent [19]
Arino et al.

[11] Patent Number: 5,728,462
[45] Date of Patent: Mar. 17, 1998

[54] CIGARETTE FILTER MATERIAL

[75] Inventors: Yuriko Arino; Hiroki Taniguchi, both of Hyogo, Japan

[73] Assignee: Daicel Chemical Industries, Ltd., Osaka, Japan

[21] Appl. No.: 357,661

[22] Filed: Dec. 16, 1994

[30] Foreign Application Priority Data

Feb. 4, 1994 [JP] Japan .................. 6-012680

[51] Int. Cl.$^6$ .................. B32B 23/00; A24B 15/28; A24D 3/06
[52] U.S. Cl. .................. 428/393; 428/372; 428/378; 131/331; 131/332; 131/345
[58] Field of Search .................. 428/372, 378, 428/393; 131/331, 332, 345

[56] References Cited

U.S. PATENT DOCUMENTS

| | | | |
|---|---|---|---|
| 1,986,349 | 1/1935 | Lardy | 428/393 |
| 2,953,837 | 9/1960 | Crawford et al. | 428/393 |
| 3,451,887 | 6/1969 | Toney et al. | 428/393 |
| 4,074,724 | 2/1978 | Morie et al. | 428/393 |
| 4,119,104 | 10/1978 | Roth | 131/2 |
| 4,186,238 | 1/1980 | Holst et al. | 428/393 |
| 4,323,625 | 4/1982 | Coran et al. | 428/393 |
| 4,896,683 | 1/1990 | Cohen et al. | 131/342 |
| 4,964,426 | 10/1990 | Lee et al. | 131/342 |
| 5,060,672 | 10/1991 | Irimi et al. | 131/31 |
| 5,150,723 | 9/1992 | Lee et al. | 131/342 |
| 5,413,676 | 5/1995 | Nguyen et al. | 162/9 |
| 5,449,555 | 9/1995 | Karstens et al. | 428/393 |
| 5,462,072 | 10/1995 | Browne et al. | 131/334 |
| 5,462,801 | 10/1995 | Willmund | 428/393 |
| 5,478,386 | 12/1995 | Itoh et al. | 106/169 |
| 5,491,024 | 2/1996 | Broduf et al. | 428/393 |

FOREIGN PATENT DOCUMENTS

| | | |
|---|---|---|
| 37-10949 | 11/1962 | Japan . |
| 63-105665 | 5/1988 | Japan . |

*Primary Examiner*—Patrick Ryan
*Assistant Examiner*—J. M. Gray
*Attorney, Agent, or Firm*—Flynn, Thiel, Boutell & Tanis PC

[57] ABSTRACT

A cigarette filter material is provided which is free from the occurrence of acetic acid odor, even after long-term storage in a hermetically sealed condition, which ensures excellent palatability. This cigarette filter material comprises a fiber assembly composed mainly of cellulose diacetate fibers and, contained therein, 80 to 10,000 ppm of a polyvalent metal salt of an acid selected from among organic and inorganic acids.

11 Claims, No Drawings

CIGARETTE FILTER MATERIAL

FIELD OF THE INVENTION

The present invention relates to a palatable cigarette filter material which is free of the odor of acetic acid.

PRIOR ART

Tobacco smoke contains alkaloids such as nicotine, phenolic compounds and a large amount of black tar. These materials exhibit hazardous action in the body when inhaled by smoking. Cigarette filters have been developed to remove the above hazardous substances, convey aroma and palatability into the mouth without any loss thereof and avoid the inadvertent in gestation of tobacco shreds at the time of smoking, and are now widely used in cigarette products.

In particular, a cigarette filter comprising cellulose diacetate fibers as a raw material is being employed with praise for passing the natural excellent aroma and palatability ingredients of the smoke ingredients while appropriately removing irritant ingredients, such as phenolic components, to thereby obtain well-balanced, excellent aroma and palatability ingredients.

The filter comprising cellulose diacetate fibers as a raw material may be produced by the following process. Cellulose diacetate is dissolved in acetone to obtain a dope, and the dope is filtered several times, extruded through a spinneret, and exposed to a high-temperature air flow to thereby evaporate the acetone component. An oiling agent is added, and the thus obtained intermediate is provided with crimps and formed into a continuous filter tow.

This filter tow is uncrimped, and, during the uncrimping, a plasticizer such as triacetin is added to the filter tow to provide a bulkiness. The resultant tow is wound in a continuous cylindrical form and cut into given lengths to thereby obtain filter plugs. The filter plugs are further cut into given lengths, and each length thereof is joined with a shredded tobacco part to thereby obtain a cigarette.

With respect to the filter composed mainly of cellulose diacetate fibers, the fiber fineness and the number of constituent fibers are strictly stipulated and the filter manufacturing conditions are precisely regulated to thereby control the resistance to the permeation of gas occurring at the time of smoking and the filtration removal of tar and nicotine ingredients.

However, the cigarette filter composed of cellulose diacetate fibers has a problem that acetic acid odor occurs when the filter material is allowed to stand in a hermetically sealed condition for a prolonged period of time. The occurrence of acetic acid odor from the filter material due to the hermetic sealing thereof for a prolonged period of time is undesirable because tobacco is, in its nature, a product containing highly sensuous qualities such as palatability and aroma. Studies have been made to solve this problem, which include adding an alkali metal salt of an acid to the filter material or immersing the filter material in a water containing calcium ions. See JP-A 63-105665(1988) and JP-A 37-10949(1962). However, these methods cannot still be stated as satisfactorily inhibiting the occurrence of acetic acid.

DESCRIPTION OF THE INVENTION

Thus, the inventors have made investigations and, as a result, found a tobacco filter material having an improved hydrolysis inhibiting effect. Principally, the present invention provides a cigarette filter material comprising a fiber assembly composed mainly of cellulose diacetate fibers and, contained therein, 80 to 10,000 ppm of a polyvalent metal salt of an acid selected from among organic and inorganic acids.

The invention provides a fibers composite comprising fiber of cellulose diacetate and 80 to 10,000 ppm, based on the weight of the fiber, of a polyvalent metal salt of an acid selected from the group consisting of organic acids and inorganic acids.

It is preferable that it further comprises fiber of another material; the polyvalent metal salt is trivalent or higher; or the polyvalent metal salt is soluble in water.

The invention moreover provides a cigarette filter tow comprising the fiber composite as defined above and a cigarette filter comprising the fiber composite as defined above and a binder.

The invention provides use of the polyvalent metal salt with a material for cigarette filters to improve the taste thereof or a method for improving the taste of tobacco thereby.

Both cellulose diacetate and triacetin contained as a plasticizer are acetic esters, and contain a minute amount of free acetic acid in addition to the compounds with an ester bond. The occurrence of free acetic acid increases because hydrolysis gradually advances over a prolonged period of time by the water contained in a minute amount in the material constituting the cigarette filter. Although the above hydrolysis reaction is essentially dependent on the amounts of cellulose diacetate and plasticizer and the water content, the hydrolysis reaction rate depends greatly on the amount of free acetic acid and the temperature of the system, especially on the amount of free acetic acid.

As seen from above, it is required that the conditions be changed to those in which the free acetic acid contained in the material constituting the cigarette filter does not accelerate the hydrolysis reaction in order to inhibit the occurrence of acetic acid odor from this material, which increases with time.

Thus, the present invention lowers the activity of the free acid contained in the material constituting the cigarette filter to thereby prevent the occurrence of acetic acid odor.

That is, in the present invention, the effect of the free acid on the acceleration of the hydrolysis reaction is remarkably restricted by contacting the free acid contained in the material constituting the cigarette filter with a polyvalent metal salt of an acid selected from among organic and inorganic acids. The effect of the addition of the polyvalent metal salt is that the activity of reactive ion species is lowered by an increase in the ionic strength attributed to the added salt.

Generally, the hydrolysis reaction of an ester is expressed by the following formula (1).

$$v = k \cdot a_{H^+} \gamma \pm [H^+] \tag{1}$$

v: reaction rate
k: rate constant
$[H^+]$: hydrogen ion concentration
$a_H^+$: activity of $H^+$
$\gamma\pm$: mean activity coefficient.

The activity coefficient ($\gamma\pm$) is represented according to Debye-Hückel's theory by the formula:

$$\log \gamma\pm = 0.5091 z^+ z^- \mu^{1/2} \tag{2}$$

$z^+, Z^-$: ionic valence
$\mu$: ionic strength

The ionic strength (μ) is represented by the formula:

$$\mu = \tfrac{1}{2}\Sigma C_i \cdot Z_i^2 \quad (3).$$

$C_i$: i-th ion concentration
$Z_i$: charge.

The above theory shows that the greater the valence of the added salt and the higher the concentration of the added salt, the greater the lowering of the activity of reactive ion species attributed to the increase of the ionic strength, so that the rate of the hydrolysis reaction is restricted. That is, it can be stated that the above investigated addition of a polyvalent metal to flakes is more remarkable in the effectiveness in inhibiting hydrolysis than the addition of an alkali metal (Japanese Patent Publication No. 105665/1988).

A single polyvalent metal salt of an acid selected among organic and inorganic acids may be used in the present invention. Alternatively, a plurality of such polyvalent metal salts may be used in combination. Examples of the organic acids include acetic acid, citric acid and malic acid. On the other hand, examples of the inorganic acids include hydrochloric acid, sulfuric acid and phosphoric acid. The polyvalent metal is, for example, a divalent metal such as magnesium, calcium, barium, titanium, iron and aluminum. As an especially preferred water-soluble polyvalent metal salt, there may be mentioned trivalent metal salts such as aluminum chloride, aluminum nitrate, aluminum sodium sulfate, aluminum potassium sulfate, aluminum acetate, aluminum citrate, ferric chloride, ferric sulfate, ferric nitrate, ferric oxalate and hydrates thereof.

The polyvalent metal salt of an acid for use in the present invention is added in a concentration of preferably 80 to 10,000 ppm, more preferably 100 to 1000 ppm.

The effect desired in the present invention, i.e., the effect of inhibiting the increase in acetic acid odor with time by lowering the activity of free acid, cannot be fully exhibited when the polyvalent metal salt is added in a concentration less than 80 ppm.

Contrarily, when the addition is made in a concentration exceeding 10,000 ppm, salt deposition and changes of aroma and palatability occur, so that results which are unfavorable from the viewpoint of use as a cigarette filter material are brought about.

The stage at which the polyvalent metal salt of an acid is to be added or the method for adding the polyvalent metal salt is not particularly limited. The polyvalent metal salt may be added, for example, at the stage of forming cellulose diacetate flakes, by a method in which the polyvalent metal salt is incorporated before spinning of acetate fibers, by a method in which the polyvalent metal salt and an oiling agent are adhered to the acetate fibers, or by a method of which the polyvalent metal salt is added to triacetin and then wound into a filter.

In the present invention, the action of the free acid per se which is present in a cigarette filter material in a minute amount is blocked by impregnating the cigarette filter material with a polyvalent metal salt of a selected acid in any of the steps for producing the cigarette filter material. By virtue of the present invention, a cigarette filter material freed from the drawback of cellulose diacetate of acetic acid odor occurring after storage for a prolonged period of time without any detriment to the advantages of the cellulose diacetate can be obtained by an economically effective process.

EXAMPLES

The present invention will now be described with reference to the following Examples, which should not be construed as limiting the scope of the invention.

Example 1

3 g of cellulose diacetate flakes were immersed in 20 ml of a 4.35×10⁻³ mol/l aqueous aluminum sulfate solution to thereby impregnate the flakes with aluminum. These flakes, in the state of being immersed in the aluminum sulfate solution, were put in vials, hermetically sealed, and stored at 60° C. in order to evaluate the behavior of the hydrolysis of the cellulose diacetate flakes within a short period of time. After the lapse of given periods of time, the amount of free acetic acid was measured. The properties of the employed cellulose diacetate flakes, the properties of the flakes impregnated with aluminum and the hydrolysis test results are shown in Tables 1, 2 and 3, respectively.

TABLE 1

Properties of Cellulose Diacetate Flakes

| | Ca | Mg | (unit: ppm) Na |
|---|---|---|---|
| Original Flakes | 0.4 | 0.03 | 43 |

TABLE 2

Properties of Cellulose Diacetate Flakes Impregnated with Aluminum

| | Ca | Mg | Na | (unit: ppm) Al |
|---|---|---|---|---|
| Flakes Impregnated with Aluminum | 0.4 | 7 | 8 | 117 |

TABLE 3

Hydrolysis Test Results

| Elapsed Time (day) | Amount of Free Acetic Acid (ppm) |
|---|---|
| 0 | 93 |
| 2 | 132 |
| 6 | 201 |
| 9 | 295 |
| 12 | 425 |
| 15 | 620 |

Example 2

3 g of cellulose diacetate flakes (same as in Example 1) were immersed in 20 ml of a 4.35×10⁻³ mol/l aqueous calcium acetate solution to thereby impregnate the flakes with calcium. These flakes in the state of being immersed in the calcium acetate solution were put in vials, hermetically sealed, and stored at 60° C. in order to evaluate the behavior of the hydrolysis of cellulose diacetate flakes within a short period of time. After the lapse of given periods of time, the amount of free acetic acid was measured. The properties of the flakes impregnated with calcium and the hydrolysis test results are shown in Tables 4 and 5, respectively.

TABLE 4

Properties of Cellulose Diacetate Flakes Impregnated with Calcium

| | Ca | Mg | (unit: ppm) Na |
|---|---|---|---|
| Flakes Impregnated with Calcium | 226 | 7 | 8 |

TABLE 5

Hydrolysis Test Results

| Elapsed Time (day) | Amount of Free Acetic Acid (ppm) |
|---|---|
| 0 | 93 |
| 2 | 173 |
| 6 | 467 |
| 9 | 835 |
| 12 | 1151 |
| 15 | 1464 |

Example 3

3 g of cellulose diacetate flakes (same as in Example 1) were immersed in 20 ml of a $4.35 \times 10^{-3}$ mol/l aqueous calcium chloride solution to thereby impregnate the flakes with calcium. These flakes in the state of immersion in the calcium chloride solution were put in vials, hermetically sealed, and stored at 60° C. in order to evaluate the behavior of the hydrolysis of cellulose diacetate flakes within a short period of time. After the lapse of given periods of time, the amount of free acetic acid was measured. The properties of the flakes impregnated with calcium and the hydrolysis test results are shown in Tables 6 and 7, respectively.

TABLE 6

Properties of Cellulose Diacetate Flakes Impregnated with Calcium

| | Ca | Mg | (unit: ppm) Na |
|---|---|---|---|
| Flakes Impregnated with Calcium | 103 | 5 | 24 |

TABLE 7

Hydrolysis Test Results

| Elapsed Time (day) | Amount of Free Acetic Acid (ppm) |
|---|---|
| 0 | 93 |
| 2 | 767 |
| 5 | 3058 |
| 7 | 5371 |
| 12 | 11722 |
| 14 | 14272 |

Comparative Example 1

3 g of cellulose diacetate flakes (same as in Example 1) in a state of immersion in 20 ml of deionized water were put in vials, hermetically sealed, and stored at 60° C. in order to evaluate the behavior of the hydrolysis of cellulose diacetate flakes within a short period of time. After the lapse of given periods of time, the amount of free acetic acid was measured. The results are shown in Table 8.

TABLE 8

Hydrolysis Test Results

| Elapsed Time (day) | Amount of Free Acetic Acid (ppm) |
|---|---|
| 0 | 93 |
| 2 | 4888 |
| 6 | 17795 |
| 7 | 20936 |
| 10 | 34831 |
| 16 | 60725 |

Comparative Example 2

3 g of cellulose diacetate flakes (same as in Example 1) were immersed in 20 ml of a $4.35 \times 10^{-3}$ mol/l aqueous sodium chloride solution to thereby impregnate the flakes with sodium. These flakes in a state of immersion in the sodium chloride solution were put in vials, hermetically sealed, and stored at 60° C. in order to evaluate the behavior of hydrolysis of cellulose diacetate flakes within a short period of time. After the lapse of given periods of time, the amount of free acetic acid was measured. The properties of the flakes impregnated with sodium and the hydrolysis test results are shown in Tables 9 and 10, respectively.

TABLE 9

Properties of Cellulose Diacetate Flakes Impregnated with Sodium

| | Ca | Mg | (unit: ppm) Na |
|---|---|---|---|
| Flakes Impregnated with Sodium | 3.0 | 8.3 | 164 |

TABLE 10

Hydrolysis Test Results

| Elapsed Time (day) | Amount of Free Acetic Acid (ppm) |
|---|---|
| 0 | 93 |
| 2 | 412 |
| 5 | 3210 |
| 7 | 7044 |
| 12 | 18456 |
| 14 | 23778 |

What is claimed is:

1. A fiber composite comprising cellulose diacetate fiber and 80 to 10.000 ppm, based on the weight of the fiber, of a polyvalent metal salt.

2. The fiber composite as claimed in claim 1, which further comprises a fiber of another material.

3. The fiber composite as claimed in claim 1, in which the polyvalent metal salt is tri-valent or higher.

4. The fiber composite as claimed in claim 1, in which the polyvalent metal salt is soluble in water.

5. A cigarette filter tow comprising the fiber composite as defined in claim 1.

6. A cigarette filter comprising the fiber composite as defined in claim 1 and a binder.

7. The fiber composite as claimed in claim 1, wherein said polyvalent metal salt is selected from the group consisting of aluminum acetate, calcium acetate and calcium chloride.

8. The fiber composite as claimed in claim 1, wherein said polyvalent metal salt is an aluminum salt.

9. A fiber composite comprising cellulose diacetate fiber and 80 to 10,000 ppm, based on the weight of the fiber, of a polyvalent metal salt of an acid selected from the group consisting of oxalic acid, acetic acid, citric acid, malic acid, nitric acid, hydrochloric acid, sulfuric acid and phosphoric acid.

10. The fiber composite as claimed in claim 9, wherein said polyvalent metal salt is selected from the group consisting of aluminum chloride, aluminum nitrate, aluminum sodium sulfate, aluminum potassium sulfate, aluminum acetate, aluminum citrate, ferric chloride, ferric sulfate, ferric nitrate, ferric oxalate, and hydrates thereof.

11. The fiber composite as claimed in claim 9, wherein said polyvalent metal salt is impregnated in said cellulose diacetate fiber.

* * * * *